US010816040B2

(12) United States Patent
Demianovich et al.

(10) Patent No.: US 10,816,040 B2
(45) Date of Patent: Oct. 27, 2020

(54) SYSTEM AND METHOD FOR COUPLING A MACHINE ASSEMBLY TO A BASE

(71) Applicant: General Electric Company, Schenectady, NY (US)

(72) Inventors: Nicholas Demianovich, Greenville, SC (US); Tomasz Maranski, Warsaw (PL); Jakub Milosz Putowski, Warsaw (PL); Piotr Krzysztof Dzieciol, Warsaw (PL); Przemyslaw Michal Jakubczak, Warsaw (PL)

(73) Assignee: General Electric Company, Schenectady, NY (US)

( * ) Notice: Subject to any disclaimer, the term of this patent is extended or adjusted under 35 U.S.C. 154(b) by 301 days.

(21) Appl. No.: 15/916,440

(22) Filed: Mar. 9, 2018

(65) Prior Publication Data
US 2018/0291963 A1   Oct. 11, 2018

(30) Foreign Application Priority Data

Apr. 7, 2017 (PL) .......................................... 421222

(51) Int. Cl.
| F16M 1/00 | (2006.01) |
| F16D 3/70 | (2006.01) |
| F01D 25/28 | (2006.01) |
| F16M 5/00 | (2006.01) |
| F02C 7/20 | (2006.01) |

(52) U.S. Cl.
CPC .............. *F16D 3/70* (2013.01); *F01D 25/28* (2013.01); *F01D 25/285* (2013.01); *F02C 7/20* (2013.01); *F16M 5/00* (2013.01); *F05D 2230/64* (2013.01); *F05D 2230/642* (2013.01); *F05D 2230/644* (2013.01); *F05D 2250/75* (2013.01); *F05D 2260/02* (2013.01); *F05D 2260/36* (2013.01)

(58) Field of Classification Search
CPC .......... F16D 3/70; F01D 25/28; F01D 25/285; F02C 7/20; F16M 5/00
USPC .................... 248/645, 671; 410/156; 244/54; 403/345
See application file for complete search history.

(56) References Cited

U.S. PATENT DOCUMENTS

| 2,970,799 A | 2/1961 | Pinson |
| 3,860,359 A | 1/1975 | De Feo |
| 6,334,746 B1 * | 1/2002 | Nguyen .................. F16M 3/00 410/156 |
| 6,793,458 B2 * | 9/2004 | Kawai ..................... F01D 25/28 415/213.1 |

(Continued)

*Primary Examiner* — Todd M Epps
(74) *Attorney, Agent, or Firm* — Charlotte C. Wilson; James W. Pemrick

(57) ABSTRACT

A coupling system for a machine assembly and a base is provided. The machine assembly includes a frame and a gib key extending outwardly from the frame. The coupling system includes at least one u-bracket configured to couple to the gib key such that said at least one u-bracket cooperates with the gib key to define a tenon pin opening. The at least one u-bracket is sized and shaped to be received in a clearance fit in a key channel defined in the base. The coupling system also includes a tenon pin sized and shaped to be received in the tenon pin opening such that the tenon pin couples the base to the gib key, and such that forces exerted on the received tenon pin parallel to a first direction are substantially in tension between the machine assembly and the base.

20 Claims, 6 Drawing Sheets

(56) References Cited

U.S. PATENT DOCUMENTS 7,950,605 B2 * 5/2011 Howard .................. B64C 27/14
　　　　　　　　　　　　　　　　　　244/54
9,394,829 B2 * 7/2016 Cabeen .................. F01D 25/28

* cited by examiner

SYSTEM AND METHOD FOR COUPLING A MACHINE ASSEMBLY TO A BASE

BACKGROUND

The field of the disclosure relates generally to transport and installation of machine assemblies, and more particularly, to a system and method for coupling a machine assembly to a base.

At least some known machine assemblies are coupled to a base that is then installed on a foundation. For example, at least some known machine assemblies are coupled to the base prior to shipping to an installation location. During shipping, due to a large size and mass of some such machine assemblies, such as but not limited to gas turbine assemblies, the system used to couple the machine assembly to the base must also be relatively massive to accommodate various types of loading encountered during shipping, which may include loading in directions substantially opposite to the forces associated with gravity. For example, but not by way of limitation, at least some such known coupling systems include a pin that is sized to accommodate loading forces between the base and machine assembly in both the compression and tension directions during shipping and installation. Thus, the pin must be sized for the larger of the two loading forces, which is typically the compression loading force due to the large mass of the machine assembly.

Moreover, it is common to position the coupled machine assembly and base on the foundation, and then remove the base-machine assembly coupling system prior to final alignment on the foundation. However, it can be difficult, labor-intensive, and time consuming to remove traditional base-machine assembly coupling systems because of their significant weight and bulk.

BRIEF DESCRIPTION

In one aspect, a coupling system for a machine assembly and a base is provided. The machine assembly includes a frame and a gib key extending outwardly from the frame. The coupling system includes at least one u-bracket configured to couple to the gib key such that said at least one u-bracket cooperates with the gib key to define a tenon pin opening. The at least one u-bracket is sized and shaped to be received in a clearance fit in a key channel defined in the base. The coupling system also includes a tenon pin sized and shaped to be received in the tenon pin opening such that the tenon pin couples the base to the gib key, and such that forces exerted on the received tenon pin parallel to a first direction are substantially in tension between the machine assembly and the base.

In another aspect, a shipping assembly is provided. The shipping assembly includes a machine assembly that includes a frame and a gib key extending outwardly from the frame. The shipping assembly also includes a base that includes a key channel. The shipping assembly further includes a coupling system. The coupling system includes at least one u-bracket coupled to the gib key. The at least one u-bracket cooperates with the gib key to define a tenon pin opening. The at least one u-bracket is received in a clearance fit in the key channel. The coupling system also includes a tenon pin received in the tenon pin opening such that forces exerted on the tenon pin parallel to a first direction are substantially in tension between the machine assembly and the base.

In another aspect, a method of coupling a machine assembly to a base is provided. The machine assembly includes a frame and a gib key extending outwardly from the frame. The method includes coupling at least one u-bracket to the gib key such that the at least one u-bracket cooperates with the gib key to define a tenon pin opening. The method also includes receiving the at least one u-bracket in a clearance fit in a key channel defined in the base. The method further includes inserting a tenon pin in the tenon pin opening such that the tenon pin couples the base to the gib key, and such that forces exerted on the received tenon pin parallel to a first direction are substantially in tension between the machine assembly and the base.

DETAILED DESCRIPTION

The embodiments described herein include coupling systems and methods for shipping and installing a machine assembly coupled to a base. The embodiments include at least one u-bracket coupled to a gib key that extends outwardly from a frame of the machine assembly. The u-bracket and gib key cooperate to define a tenon pin opening. The tenon pin opening is configured to receive a tenon pin to couple the machine assembly to the base for shipping and installation. In addition, the tenon pin opening orients the tenon pin such that forces exerted on the tenon pin are substantially in tension between the machine assembly and the base. Thus, the tenon pin is not exposed to compressive forces between the machine assembly and the base, which tend to be much higher than tension forces during shipping due to a weight of the machine assembly.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
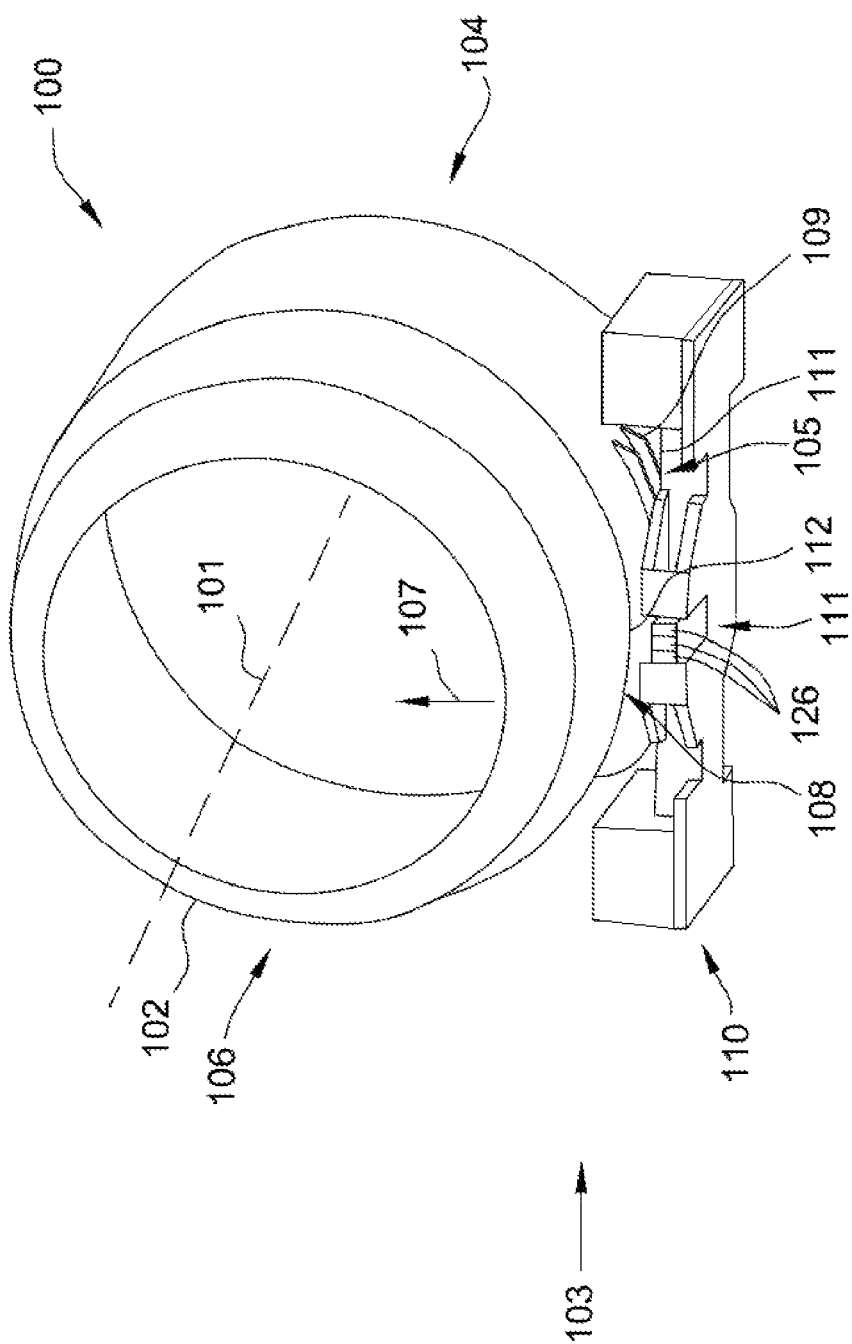
FIG. 1 is a schematic view of an exemplary shipping assembly that includes an exemplary machine assembly coupled to an exemplary base.

FIG. 1 is a schematic view of an exemplary shipping assembly 103 that includes an exemplary machine assembly 100 coupled to an exemplary base 110. In the exemplary embodiment, machine assembly 100 is a gas turbine engine. In alternative embodiments, machine assembly 100 is another turbine engine and/or rotary machine, including, without limitation, a steam turbine engine, a gas turbofan aircraft engine, other aircraft engine, a wind turbine, a compressor, and/or a pump. In other alternative embodiments, machine assembly 100 is any machine assembly to which embodiments of the coupling system described herein may be suitably applied.

In the exemplary embodiment, machine assembly 100 includes a casing 102 that extends from a first end 104 to a second end 106. In the exemplary embodiment, casing 102 is generally annular in shape. For example, but not by way of limitation, first end 104 houses an intake section (not shown) and second end 106 houses an exhaust section (not shown) of a gas turbine engine. Alternatively, casing 102 has any suitable shape to which the coupling system described herein may be suitably applied.

During shipping and installation, machine assembly and base 110 in shipping assembly 103 are subject to forces parallel to a first direction 107. More specifically, forces parallel to first direction 107 include compression forces, i.e., forces that tend to compress machine assembly 100 and base 110 together parallel to first direction 107, and tension forces, i.e., forces that tend to pull machine assembly 100 and base 110 apart parallel to first direction 107. In the exemplary embodiment, first direction 107 is oriented vertically relative to an intended orientation of casing 102 after machine assembly 100 is installed at its final destination, as shown in FIG. 1. In alternative embodiments, first direction 107 is oriented in any suitable direction. In addition, a central horizontal axis 101 extends from first end 104 to second end 106, and is oriented horizontally relative to the intended orientation of casing 102 after machine assembly 100 is installed at its final destination.

Casing 102 includes a frame 108 coupled adjacent to second end 106. For example, but not by way of limitation, frame 108 is an exhaust frame of a gas turbine engine. Casing 102 also includes a gib key 112 that extends outwardly, parallel to first direction 107, from frame 108. In some embodiments, gib key 112 is formed integrally with frame 108. Alternatively, gib key 112 is coupled to frame 108 in any suitable fashion, such as by welding.

Machine assembly 100 and base 110 in shipping assembly 103 are coupled together between gib key 112 and first end 104 by at least one compression loading interface 105. Compression loading interface 105 is configured to bear static and dynamic compression forces parallel to first direction 107 during shipping and installation of machine assembly 100 and base 110. For example, in some embodiments, compression loading interface 105 includes at least one rib 109 coupled to frame 102 that couples to at least one beam 111 of base 110. Additionally or alternatively, compression loading interface 105 includes any suitable structure configured to bear static and dynamic compression forces parallel to first direction 107 during shipping and installation of machine assembly 100 and base 110.

Figure 2:
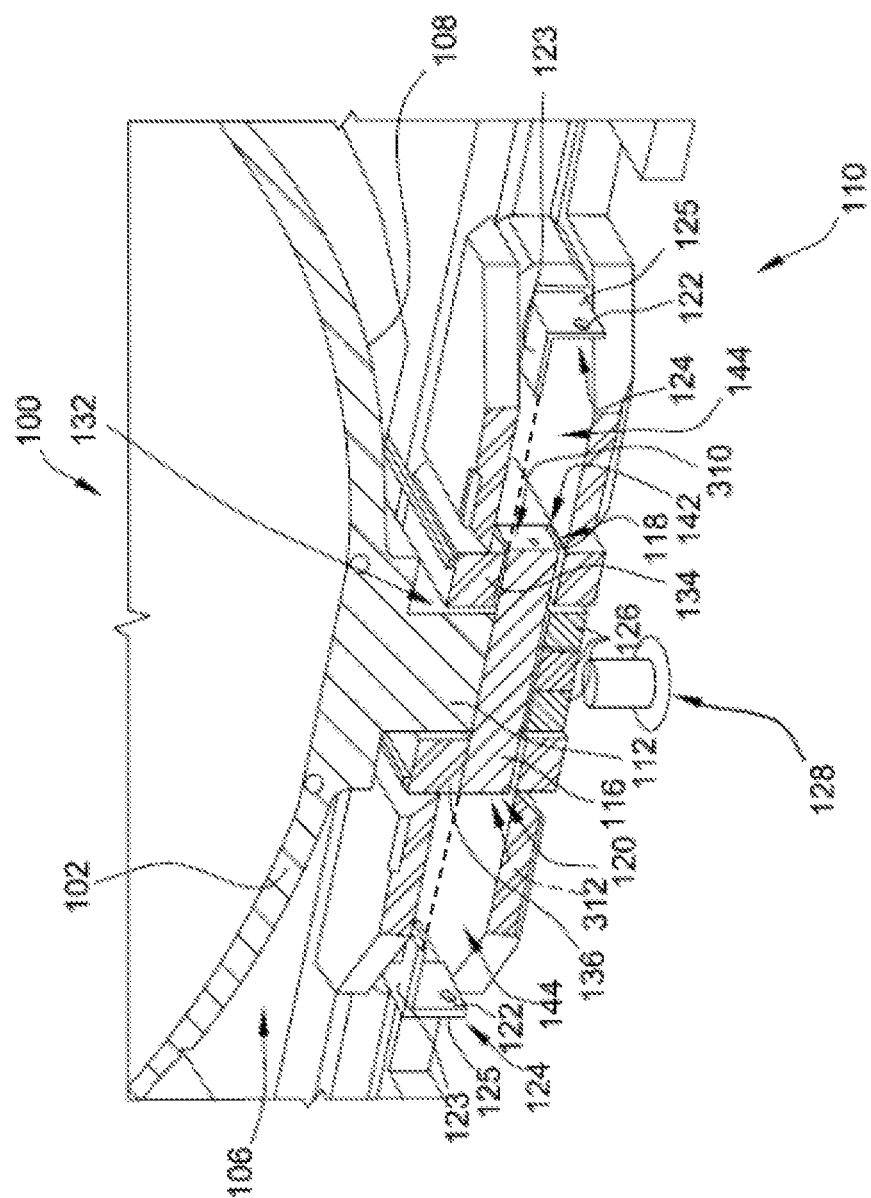
FIG. 2 is a perspective sectional view of a portion of the shipping assembly shown in FIG. 1, illustrating an exemplary coupling system.
Figure 3:
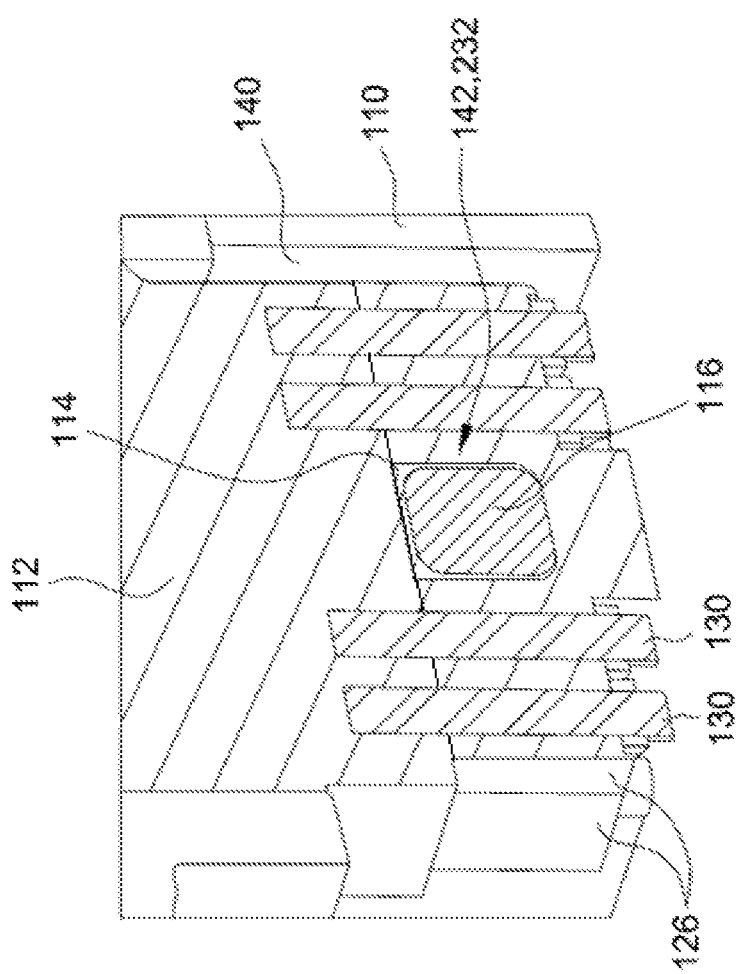
FIG. 3 is a perspective sectional view of another portion of the shipping assembly shown in FIG. 1, from a viewpoint generally transverse to the view of FIG. 2, illustrating the coupling system shown in FIG. 2.

FIG. 2 is a perspective sectional view of a portion of shipping assembly 103, illustrating an exemplary coupling system 111. FIG. 3 is a perspective sectional view of another portion of shipping assembly 103, from a viewpoint generally transverse to the view of FIG. 2. With reference to FIGS. 1-3, machine assembly 100 and base 110 in shipping assembly 103 are further coupled together via coupling system 111. More specifically, coupling system 111 is configured to bear static and dynamic tension forces between machine assembly 100 and base 110 parallel to first direction 107 during shipping and installation of machine assembly 100 and base 110.

A key channel 132 is defined in base 110 at least partially by a pair of opposing base channel walls 134 and 136 oriented parallel to central horizontal axis 101. In the exemplary embodiment, base channel walls 134 and 136 are oriented parallel to central horizontal axis 101. In alternative embodiments, base channel walls 134 and 136 are oriented in any suitable fashion that enables coupling system 111 to function as described herein. Gib key 112 is sized and shaped to be received between base channel walls 134 and 136 in a clearance fit when machine assembly 100 is lowered onto base 110. In the exemplary embodiment, key channel 132 is further defined in base 110 at least partially by a transverse base channel wall 140 that extends between opposing base channel walls 134 and 136, and gib key 112 is sized and shaped to be received adjacent transverse base channel wall 140 in a clearance fit when machine assembly 100 is lowered onto base 110. In alternative embodiments, key channel 132 is defined in base 110 in any suitable fashion that enables coupling system 111 to function as described herein.

Coupling system 111 includes at least one u-bracket 126 coupled to gib key 112. More specifically, the at least one u-bracket 126 is coupled to gib key 112 radially outward of gib key 112. The at least one u-bracket 126 cooperates with gib key 112 to define a tenon pin opening 142.

For example, in the exemplary embodiment, coupling system 111 includes three u-brackets 126. In some embodiments, a number of adjacent u-brackets 126 is used, rather than a single thicker u-bracket 126, to reduce a weight of, and thus facilitate easier handling of, individual u-brackets 126. In alternative embodiments, coupling system 111 includes any suitable number of u-brackets 126. In the exemplary embodiment, each u-bracket 126 is coupled to aft gib key 112 by at least one fastener 130. In alternative embodiments, each u-bracket 126 is coupled to aft gib key 112 in any suitable fashion that enables u-brackets 126 to function as described herein.

The at least one u-bracket 126 is shaped and sized to be received in key channel 132 in a clearance fit when machine assembly 100 is lowered onto base 110. For example, in the exemplary embodiment, the at least one u-bracket 126 is shaped and sized to be received between base channel walls 134 and 136, adjacent transverse base channel wall 140, in a clearance fit when machine assembly 100 is lowered onto base 110. In the exemplary embodiment, the at least one u-bracket 126 is coupled to gib key 112 prior to insertion of gib key 112 in key channel 132. In alternative embodiments, the at least one u-bracket 126 is coupled to gib key 112 after insertion of gib key 112 in key channel 132.

Figure 4:
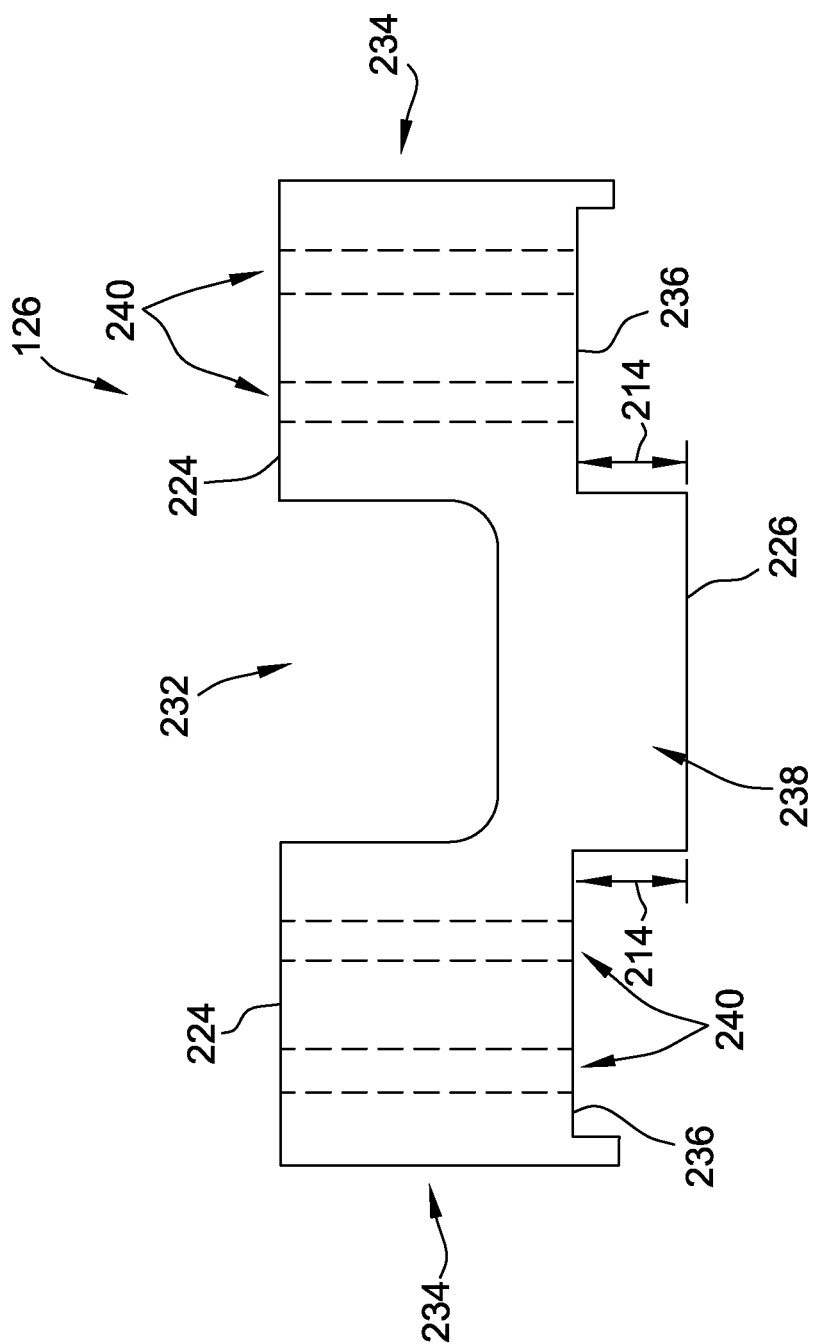
FIG. 4 is a side elevation view of an exemplary u-bracket that may be used with the coupling system shown in FIG. 2.

FIG. 4 is a side elevation view of an exemplary embodiment of u-bracket 126. U-bracket 126 includes a pair of opposing coupling portions 234 configured to couple against gib key 112 (shown in FIG. 3), and a u-channel 232 defined therebetween. Coupling portions 234 are coupled together by a bridge portion 238 extending therebetween. Bridge portion 238 further defines u-channel 232.

In the exemplary embodiment, at least one fastener opening 240 extends through each coupling portion 234 and is configured to receive a corresponding fastener 130 (shown in FIG. 3) therethrough. Alternatively, u-bracket 126 does not include fastener openings 240, and is configured for coupling to gib key 112 in any other suitable fashion that enables u-brackets 126 to function as described herein. In the exemplary embodiment, a radially outer face 236 of each coupling portion 234 is offset radially inwardly by an offset distance 214 from a radially outer face 226 of bridge portion 228. Offset distance 214 is configured to enable a head of each fastener 130 to be positioned radially inwardly from outer face 226 of bridge portion 238 when u-bracket 126 is coupled to gib key 112. In alternative embodiments, radially outer face 236 of coupling portion 234 is other than offset radially inwardly from radially outer face 226 of bridge portion 228.

With reference to FIGS. 1-4, in the exemplary embodiment, each coupling portion 234 includes a radially inner, with respect to central horizontal axis 101, surface 224 configured to couple against a radially outer surface 114 of gib key 112. After u-bracket 126 is coupled to gib key 112, radially outer surface 114 further extends between opposing coupling portions 234 across u-channel 232, such that u-channel 232 defines a central portion of tenon pin opening 142.

Figure 5:
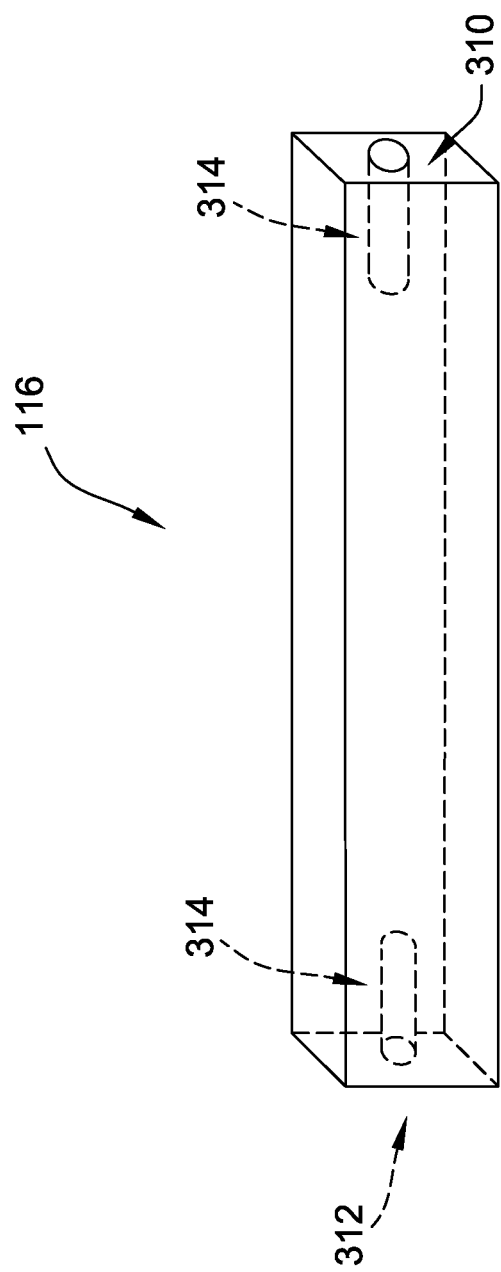
FIG. 5 is a perspective view of an exemplary tenon pin that may be used with the coupling system shown in FIG. 2.

FIG. 5 is a perspective view of an exemplary tenon pin 116 that may be used with coupling system 111. In the exemplary embodiment, tenon pin 116 extends in elongated fashion from a first end 310 to a second end 312 and has a generally rectangular cross-section therebetween. In alternative embodiments, tenon pin 116 is shaped in any suitable fashion that enables coupling system 111 to function as described herein. In the exemplary embodiment, tenon pin 116 includes respective threaded fastener openings 314 defined at each of opposing ends 310 and 312. In alternative embodiments, tenon pin 116 does not include fastener openings 314.

With reference to FIGS. 2-5, in the exemplary embodiment, tenon pin 116 is sized and shaped to be received in tenon pin opening 142 such that base 110 is coupled to gib key 112 of machine assembly 100. More specifically, opposing base channel walls 134 and 136 define respective openings 118 and 120 extending therethrough. Openings 118 and 120 are sized, shaped, and oriented to align with u-channel 232 of the at least one u-bracket 126 to define tenon pin opening 142 when gib key 112, and the at least one u-bracket 126 coupled thereto, is received in key channel 132. Tenon pin 116 is then slidably insertable into tenon pin opening 142.

In the exemplary embodiment, tenon pin opening 142 is configured to receive tenon pin 116 such that forces exerted on received tenon pin 116 are substantially in tension between machine assembly 100 and base 110 parallel to first direction 107. More specifically, tenon pin 116 is oriented by tenon pin opening 142 such that tenon pin 116 reacts primarily tension forces between machine assembly 100 and base 110, i.e., forces that tend to separate machine assembly 100 from base 110, rather than compression forces, i.e., forces that tend to compress machine assembly 100 and base 110 together, parallel to first direction 107. For example, tenon pin 116 reacts tension forces exerted upon machine assembly 100 by base 110, and vice versa, by resisting upward movement, with respect to the orientation shown in FIG. 2, of the at least one u-bracket 126 coupled to gib key 112 of casing 102, and resisting downward movement of the opposing base channel walls 134 and 136 coupled to base 110, while compression loading interface 105 (shown in FIG. 1) suitably reacts substantially all compression forces exerted upon machine assembly 100 by base 110, and vice versa.

Moreover, in the exemplary embodiment, static and dynamic tension forces associated with shipping and installation of machine assembly 100 and base 110 in shipping assembly 103 are substantially less than static and dynamic compression forces associated with shipping and installation. For example, the compression forces include static and dynamic forces associated with a weight of rotary machine 100. In the exemplary embodiment, because tenon pin opening 142 is configured to orient tenon pin 116 to react substantially tension, rather than compression, forces parallel to first direction 107, a required size and/or material strength of tenon pin 116 is reduced relative to a size and/or strength that would be required to react both tension and compression forces parallel to first direction 107 between machine assembly 100 and base 110. In alternative embodiments, tenon pin opening 142 is configured to orient tenon pin 116 to react both tension and compression forces parallel to first direction 107 between machine assembly 100 and base 110.

With reference again to FIG. 2, in the exemplary embodiment, coupling system 111 further includes a pair of shim keys 122 configured to facilitate retention of tenon pin 116 within tenon pin opening 142 during shipping of machine assembly 100 and base 110. More specifically, each shim key 122 includes a shim portion 123 configured to be received in a friction fit between tenon pin 116 and a respective one of base channel walls 134 and 136 adjacent respective openings 118 and 120. Additionally in the exemplary embodiment, each shim key 122 includes a cover portion 125 extending orthogonally to shim portion 123 and configured to couple against a respective one of ends 310 and 312 of tenon pin 116. For example, but not by way of limitation, each cover portion 125 defines an opening 124 extending therethrough and configured to align with threaded fastener openings 314 of opposing ends 310 and 312, and shim keys 122 are securely coupleable to tenon pin 116 using suitable threaded fasteners (not shown) received through openings 124 into openings 314. Shim keys 122 are thus decoupleable from tenon pin 116, after removal of the threaded fasteners, to facilitate removal of tenon pin 116 during or after installation of machine assembly 100. In alternative embodiments, shim keys 122 have any suitable structure that enables shim keys 122 to function as described herein. In other alternative embodiments, coupling system 111 does not include shim keys 122.

Also in the exemplary embodiment, base 110 includes a pair of access ports 144 extending generally parallel and adjacent to tenon pin opening 142 on opposing sides of tenon pin opening 142. Access ports 144 are sized and shaped to facilitate insertion of tenon pin 116 into, and extraction of tenon pin 116 from, tenon pin opening 142 after the at least one u-bracket 126 is received within key channel 132. Additionally or alternatively, base 110 includes any other suitable structure that facilitates insertion and/or extraction of tenon pin 116.

With reference to FIGS. 1, 2, and 4, in the exemplary embodiment, bridge portion 228 of the at least one u-bracket 126 is further configured to interface with an alignment tool 128 during installation of base 110 and machine assembly 100. For example, in the exemplary embodiment, upon arrival at the installation site, machine assembly 100 coupled to base 110 in shipping assembly 103 is positioned on a foundation (not shown). To facilitate fine alignment between machine assembly 100 and base 110, alignment tool 128 is placed beneath the at least one u-bracket 126, and tenon pin 116 is withdrawn from tenon pin passageway 142. Installation alignment tool 128 is coupled directly against radially outer face 226 of bridge portion 228 and manipulated to facilitate fine positioning of machine assembly 100 with respect to base 110. In some embodiments, after machine assembly 100 is finely positioned with respect to base 110, the at least one u-bracket 126 is decoupled from gib key 112. In alternative embodiments, the at least one u-bracket 126 remains coupled to gib key 112 after installation. In other alternative embodiments, machine assembly 100 is finally positioned with respect to base 110 in any suitable fashion that enables machine assembly 100 to function as described herein.

Figure 6:
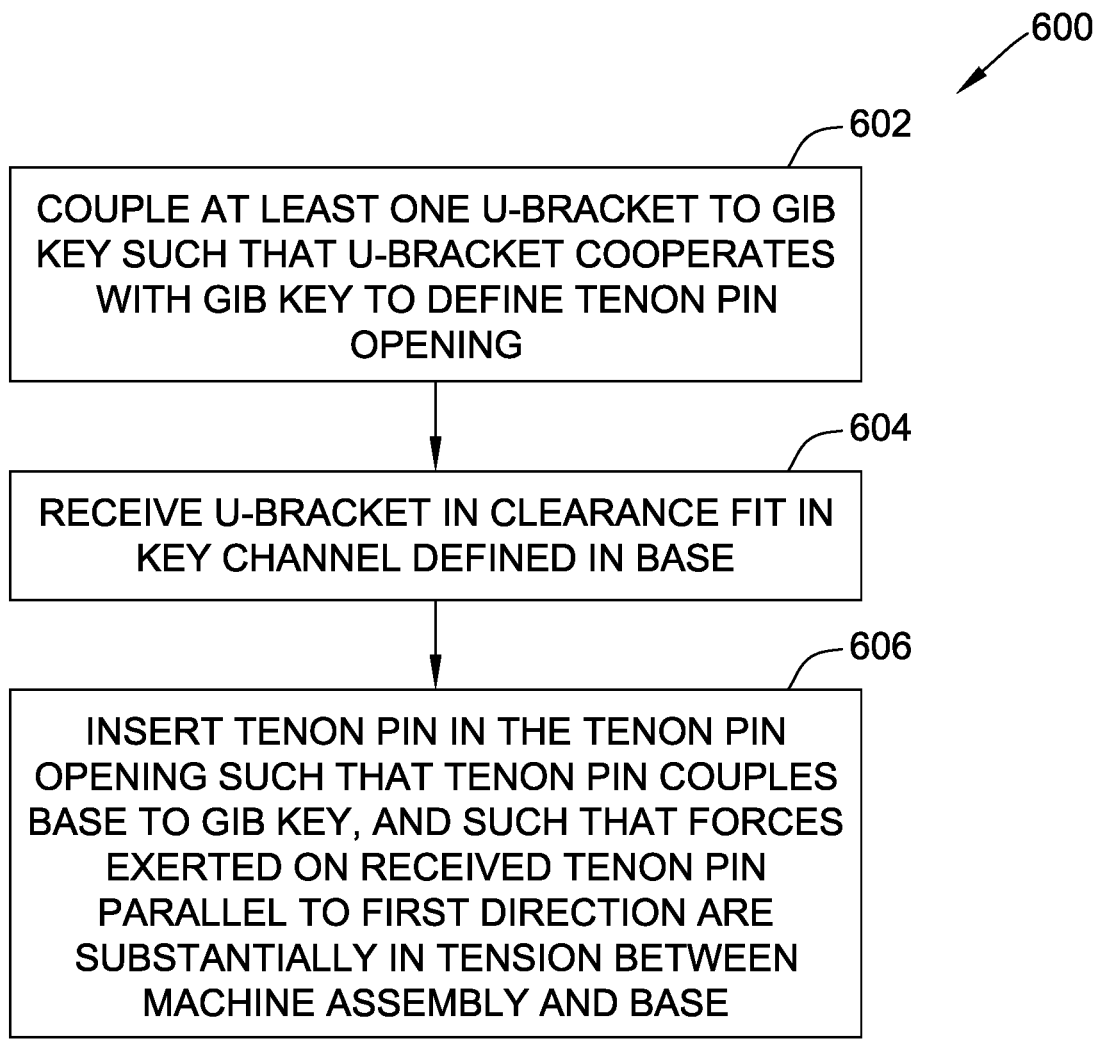
FIG. 6 is a flow diagram of an exemplary method of coupling a machine assembly, such as the machine assembly shown in FIG. 1, to a base, such as the base shown in FIG. 1.

FIG. 6 is a flow diagram illustrating an exemplary method 600 of coupling a machine assembly, such as machine assembly 100, to a base, such as base 110. With reference also to FIGS. 1-5, the machine assembly includes a frame and a gib key extending outwardly from the frame, such as frame 108 and gib key 112. In the exemplary embodiment, method 600 includes coupling 602 at least one u-bracket, such as u-bracket 126, to the gib key such that the at least one u-bracket cooperates with the gib key to define a tenon pin opening, such as tenon pin opening 142. Method 600 also includes receiving 604 the at least one u-bracket in a clearance fit in a key channel, such as key channel 132, defined in the base. Method 600 further includes inserting 606 a tenon pin, such as tenon pin 116, in the tenon pin opening such that the tenon pin couples the base to the gib key, and such that forces exerted on the received tenon pin parallel to a first direction, such as first direction 107, are substantially in tension between the machine assembly and the base.

The above-described embodiments of coupling systems and methods overcome at least some disadvantages of known coupling systems and methods for shipping and installing a machine assembly coupled to a base. Specifically, the embodiments orient a tenon pin in a tenon pin opening such that forces exerted on the tenon pin are substantially in tension between the machine assembly and the base. By substantially avoiding exposure of the tenon pin to compressive forces between the machine assembly and the base, which tend to be much higher than tension forces during shipping due to a weight of the machine assembly, a size and weight of the coupling system can be reduced relative to at least some known coupling systems. Thus, a cost of the coupling system, an overall weight of the shipping assembly, an amount of labor and time required to apply the coupling system to the shipping assembly, and an amount of labor and time required to remove the coupling system after installation are reduced. Also specifically, in some embodiments, the coupling system provides a useful interface for an installation tool used to finely position the machine assembly with respect to the base at the installation site.

Exemplary embodiments of coupling systems and methods for shipping and installing a machine assembly coupled to a base are described above in detail. The systems and methods are not limited to the specific embodiments described herein, but rather, components of systems and/or steps of the methods may be utilized independently and separately from other components and/or steps described herein. For example, the systems and methods may also be used in combination with other bases and machine assemblies, and are not limited to practice with the base and machine assembly as described herein. Rather, the exemplary embodiment can be implemented and utilized in connection with many other machine assembly and base applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A coupling system for a machine assembly and a base, the machine assembly including a frame and a gib key coupled to the frame, said coupling system comprising:
    at least one u-bracket configured to couple to the gib key such that said at least one u-bracket cooperates with the gib key to define a tenon pin opening, wherein said at least one u-bracket is sized and shaped to be received in a clearance fit in a key channel defined in the base; and
    a tenon pin sized and shaped to be received in said tenon pin opening such that said tenon pin couples the base to the gib key, and such that forces exerted on said received tenon pin parallel to a first direction are substantially in tension between the machine assembly and the base.

2. The coupling system in accordance with claim 1, wherein said at least one u-bracket comprises a pair of opposing coupling portions configured to couple against the gib key, and a u-channel defined therebetween, said u-channel configured to define a central portion of said tenon pin opening.

3. The coupling system in accordance with claim 2, wherein said at least one u-bracket further comprises a bridge portion disposed between and coupled to said pair of opposing coupling portions, said bridge portion further defines said u-channel.

4. The coupling system in accordance with claim 1, further comprising a pair of shim keys, each of said shim keys comprising a shim portion configured to be received in a friction fit between said tenon pin and a respective base channel wall that at least partially defines said tenon pin opening.

5. The coupling system in accordance with claim 4, wherein each of said shim keys further comprises a cover portion oriented orthogonally to said shim portion and configured to couple against a respective end of said tenon pin.

6. A shipping assembly comprising:
    a machine assembly comprising a frame and a gib key coupled to said frame;

a base comprising a key channel; and a coupling system comprising:

at least one u-bracket coupled to said gib key, said at least one u-bracket cooperates with said gib key to define a tenon pin opening, said at least one u-bracket received in a clearance fit in said key channel; and a tenon pin received in said tenon pin opening such that forces exerted on said tenon pin parallel to a first direction are substantially in tension between said machine assembly and said base.

7. The shipping assembly in accordance with claim 6, further comprising at least one compression loading interface configured to bear compression forces between said machine assembly and said base parallel to the first direction.

8. The shipping assembly in accordance with claim 7, wherein said at least one compression loading interface comprises at least one rib coupled to said frame, said at least one rib couples to at least one beam of said base.

9. The shipping assembly in accordance with claim 7, wherein said machine assembly comprises a casing that extends from a first end to a second end, said frame is coupled adjacent said second end, said at least one compression loading interface is positioned between said gib key and said first end.

10. The shipping assembly in accordance with claim 6, wherein said base further comprises a pair of opposing base channel walls that cooperate to define said key channel.

11. The shipping assembly in accordance with claim 10, wherein said machine assembly comprises a casing that extends from a first end to a second end, a central horizontal axis extends from said first end to said second end, said pair of opposing base channel walls is oriented parallel to the central horizontal axis.

12. The shipping assembly in accordance with claim 10, wherein said base further comprises a transverse base channel wall that extends between said opposing base channel walls, said transverse base channel wall further defines said key channel.

13. The shipping assembly in accordance with claim 10, wherein each of said opposing base channel walls comprises an opening defined therethrough, said opening at least partially defining said tenon pin opening.

14. The shipping assembly in accordance with claim 13, wherein said at least one u-bracket comprises a pair of opposing coupling portions configured to couple against said gib key and a u-channel defined therebetween, said u-channel aligned with each said opening of said opposing base channel walls, said u-channel defines a central portion of said tenon pin opening.

15. The shipping assembly in accordance with claim 6, wherein said base includes a pair of access ports oriented generally parallel and adjacent to said tenon pin opening on opposing sides of said tenon pin opening, said access ports being sized and shaped to facilitate extraction of said tenon pin from said tenon pin opening.

16. The shipping assembly in accordance with claim 6, further comprising a pair of shim keys, each of said shim keys comprising a shim portion received in a friction fit between said tenon pin and a respective base channel wall that at least partially defines said tenon pin opening.

17. A method of coupling a machine assembly to a base, the machine assembly including a frame and a gib key extending outwardly from the frame, said method comprising:

coupling at least one u-bracket to the gib key such that the at least one u-bracket cooperates with the gib key to define a tenon pin opening;

receiving the at least one u-bracket in a clearance fit in a key channel defined in the base;

inserting a tenon pin in the tenon pin opening such that the tenon pin couples the base to the gib key, and such that forces exerted on the received tenon pin parallel to a first direction are substantially in tension between the machine assembly and the base.

18. The method of claim 17, further comprising coupling the machine assembly to the base via at least one compression loading interface configured to bear compression forces between the machine assembly and the base parallel to the first direction.

19. The method of claim 17, wherein the at least one u-bracket includes a pair of opposing coupling portions and a u-channel defined therebetween, said inserting the tenon pin in the tenon pin opening comprises inserting the tenon pin through the u-channel.

20. The method of claim 19, wherein the base further includes a pair of opposing base channel walls that cooperate to define the key channel, said inserting the tenon pin in the tenon pin opening further comprises inserting the tenon pin through a respective opening defined in each of the opposing base channel walls.

* * * * *